(12) United States Patent
Masunaga et al.

(10) Patent No.: US 12,103,240 B2
(45) Date of Patent: Oct. 1, 2024

(54) BONDING METHOD AND BONDING DEVICE

(71) Applicants: BRANSON ULTRASONICS CORPORATION, Brookfield, CT (US); ORIHIRO ENGINEERING CO., LTD., Tomioka (JP)

(72) Inventors: Toshiyuki Masunaga, Atsugi (JP); Suguru Saiki, Atsugi (JP); Masataka Tsuruta, Tomioka (JP); Tsubasa Shintani, Tomioka (JP)

(73) Assignees: BRANSON ULTRASONICS CORPORATION, Brookfield, CT (US); ORIHIRO ENGINEERING CO., LTD., Tomioka (JP)

( * ) Notice: Subject to any disclaimer, the term of this patent is extended or adjusted under 35 U.S.C. 154(b) by 527 days.

(21) Appl. No.: 17/294,764

(22) PCT Filed: Nov. 20, 2019

(86) PCT No.: PCT/JP2019/045379
§ 371 (c)(1),
(2) Date: May 18, 2021

(87) PCT Pub. No.: WO2020/105664
PCT Pub. Date: May 28, 2020

(65) Prior Publication Data
US 2021/0402709 A1    Dec. 30, 2021

(30) Foreign Application Priority Data
Nov. 20, 2018    (JP) ................. 2018-217062

(51) Int. Cl.
*B29C 65/08*    (2006.01)
*B29C 65/20*    (2006.01)
*B29C 65/72*    (2006.01)

(52) U.S. Cl.
CPC .............. *B29C 65/08* (2013.01); *B29C 65/20* (2013.01); *B29C 65/72* (2013.01)

(58) Field of Classification Search
CPC ......... B29C 65/08; B29C 65/20; B29C 65/72; B29C 65/081; B29C 65/7888;
(Continued)

(56) References Cited

U.S. PATENT DOCUMENTS 5,125,886 A * 6/1992 Dirksing ............... B29C 66/131
264/249
5,606,844 A * 3/1997 Takagaki ........... B65D 75/5883
53/DIG. 2
(Continued)

FOREIGN PATENT DOCUMENTS

| JP | H3231831 A | 10/1991 |
|----|------------|---------|
| JP | H7323478 A | 12/1995 |

(Continued)

OTHER PUBLICATIONS

Office Action regarding Japanese Patent Application No. 2018-217062, dated Jun. 7, 2022. Translation provided by Kawaguti & Partners.
(Continued)

*Primary Examiner* — Jeffrey M Wollschlager
(74) *Attorney, Agent, or Firm* — Harness, Dickey & Pierce, P.L.C.

(57) ABSTRACT

Provided is a bonding method capable of bonding with an inexpensive structure while avoiding an increase in the overall size of the device. The bonding method comprises: an arrangement step for locating a cylindrical body between two sheet-shaped members; a cylindrical body bonding step for applying an ultrasonic wave from the outer surface of a first sheet-shaped member through a horn part and applying heat from the outer surface of a second sheet-shaped mem-
(Continued)

ber through an anvil part, in a state in which the cylindrical body is arranged between the two sheet-shaped members; and a shoulder part bonding step for directly bonding, through a pair of heating parts, the two sheet-shaped members to each other while the two sheet-shaped members are interposed between the pair of heating parts.

5 Claims, 10 Drawing Sheets

(58) Field of Classification Search
CPC ............. B29C 66/1122; B29C 66/3452; B29C 66/431; B29C 66/4312; B29C 66/83221; B29C 66/53263; B29C 65/18; B29C 66/7392; B29C 66/73921; B29C 66/81419; B29C 66/81423; B29C 66/81431; B29C 66/8511; B29L 2031/7128
See application file for complete search history.

(56) References Cited

U.S. PATENT DOCUMENTS

| | | | |
|---|---|---|---|
| 9,427,912 B2 | 8/2016 | Schneider et al. | |
| 2005/0145317 A1* | 7/2005 | Yamamoto | A61F 13/15739 156/290 |
| 2011/0303345 A1* | 12/2011 | Grass | B29C 66/83221 156/73.1 |
| 2017/0120552 A1 | 5/2017 | Franca et al. | |

FOREIGN PATENT DOCUMENTS

| | | |
|---|---|---|
| JP | 2003-118745 A | 4/2003 |
| JP | 2014-065277 A | 4/2014 |
| JP | 2018-533496 A | 11/2018 |

OTHER PUBLICATIONS

International Search Report and Written Opinion of the International Searching Authority (English and Japanese) issued in PCT/JP2019/045379, dated Dec. 24, 2019; ISA/JP.

First Office Action regarding Chinese Patent Application No. 201980075911.1, dated Dec. 2, 2022. Translation provided by Kawaguti & Partners.

* cited by examiner

A BONDING METHOD AND BONDING DEVICE

CROSS-REFERENCE TO RELATED APPLICATIONS

This application is a U.S. National Phase Application under 35 U.S.C. 371 of International Application No. PCT/JP2019/045379, filed on Nov. 20, 2019, which claims priority to Japanese Patent Application No. 2018-217062, filed on Nov. 20, 2018. The entire disclosures of the above applications are expressly incorporated by reference herein.

TECHNICAL FIELD

The present invention relates to a bonding method and a bonding device for providing a structure including a cylindrical body held between two members.

BACKGROUND ART

Patent Literature 1 discloses the technique configured as the device for welding the stopper to the object member to be formed into the bag-shaped article in the end. The device is configured to have the stopper interposed between two sheet-shaped members, and apply ultrasonic waves to an outer surface of one of the sheet-shaped members and an outer surface of the other sheet-shaped member so that the two sheet-shaped members and the stopper are welded.

The above-described device requires two units of ultrasonic wave application mechanisms to be provided for the corresponding outer surfaces of the sheet-shaped members, respectively, resulting in significantly costly structure.

Provision of those large-sized ultrasonic wave application mechanisms at the respective sides of the two sheet-shaped members needs large space for installation. This tends to increase the overall size of the welding device.

CITATION LIST

Patent Literature

Patent Literature 1: U.S. Pat. No. 9,427,912

SUMMARY OF INVENTION

Technical Problem

The present invention has been made in light of the foregoing circumstances. It is an object of the present invention to provide the bonding method and the bonding device, which avoid increase in the overall size of the device, and allow bonding with the less costly structure.

Solution to Problem

For achievement of the above-described object, the present invention provides a bonding method for bonding two sheet-shaped members and a cylindrical body interposed between the two sheet-shaped members. The method includes an arrangement step for locating the cylindrical body between the two sheet-shaped members, a cylindrical body bonding step for bonding the cylindrical body to the two sheet-shaped members by applying an ultrasonic wave to an outer surface of a first one of the sheet-shaped members using a horn part, and applying heat to an outer surface of a second one of the sheet-shaped members using an anvil part, in a state where the cylindrical body is interposed between the two sheet-shaped members, and a shoulder part bonding step for directly bonding the two sheet-shaped members by a pair of heaters with holding the two sheet-shaped members between a pair of heaters, in a state where the cylindrical body is interposed between the two sheet-shaped members.

For achievement of the object, the present invention provides a bonding device which includes a transporting mechanism for moving two sheet-shaped members and a cylindrical body which is interposed between the two sheet-shaped members in a predetermined transporting direction, a horn part disposed at an outer surface side of a first one of the sheet-shaped members for applying an ultrasonic wave to an outer surface of the first sheet-shaped member, an anvil part disposed at an outer surface side of a second one of the sheet-shaped member for holding the two sheet-shaped members and the cylindrical body between the anvil part and the horn part, and applying heat to an outer surface of the second sheet-shaped member, and a pair of heaters disposed at a downstream side from the horn part and the anvil part in the transporting direction for holding at least the two sheet-shaped members and applying heat to the two sheet-shaped members.

Advantageous Effect of Invention

The present invention allows bonding operations using the less costly structure while avoiding increase in the overall size of the device.

DESCRIPTION OF EMBODIMENT

Figure 1:
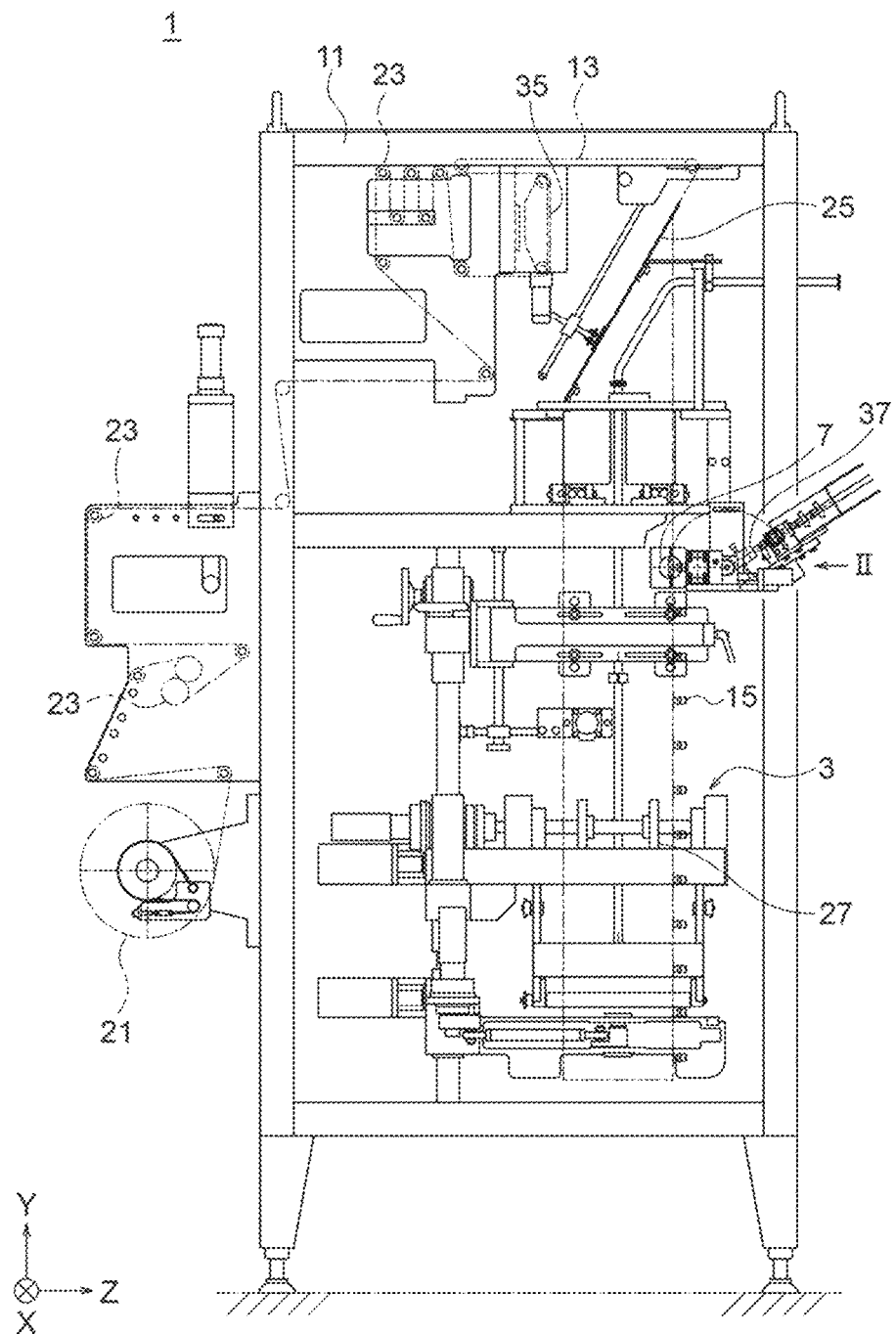
FIG. 1 illustrates an overall structure of a bonding device according to an embodiment of the present invention.

An explanation will be made with respect to the bonding method and the bonding device according to the present invention in the form of a packaging method and a packaging device for bonding a spout (stopper) to a pouch film referring to the drawings. In the drawings, the same code represents the same or corresponding part.

Figure 2:
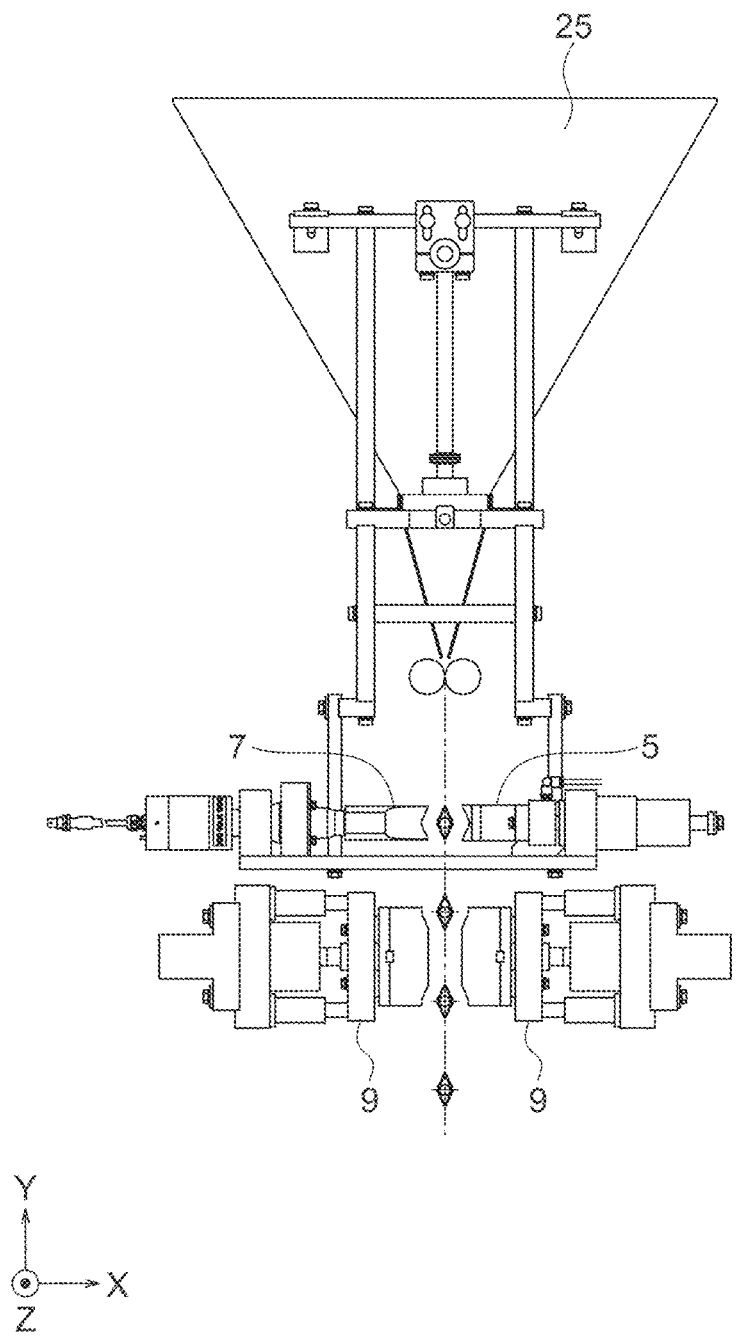
FIG. 2 illustrates a horn part, an anvil part, and a pair of heaters, which are seen from an arrow II of FIG. 1.
Figure 3:
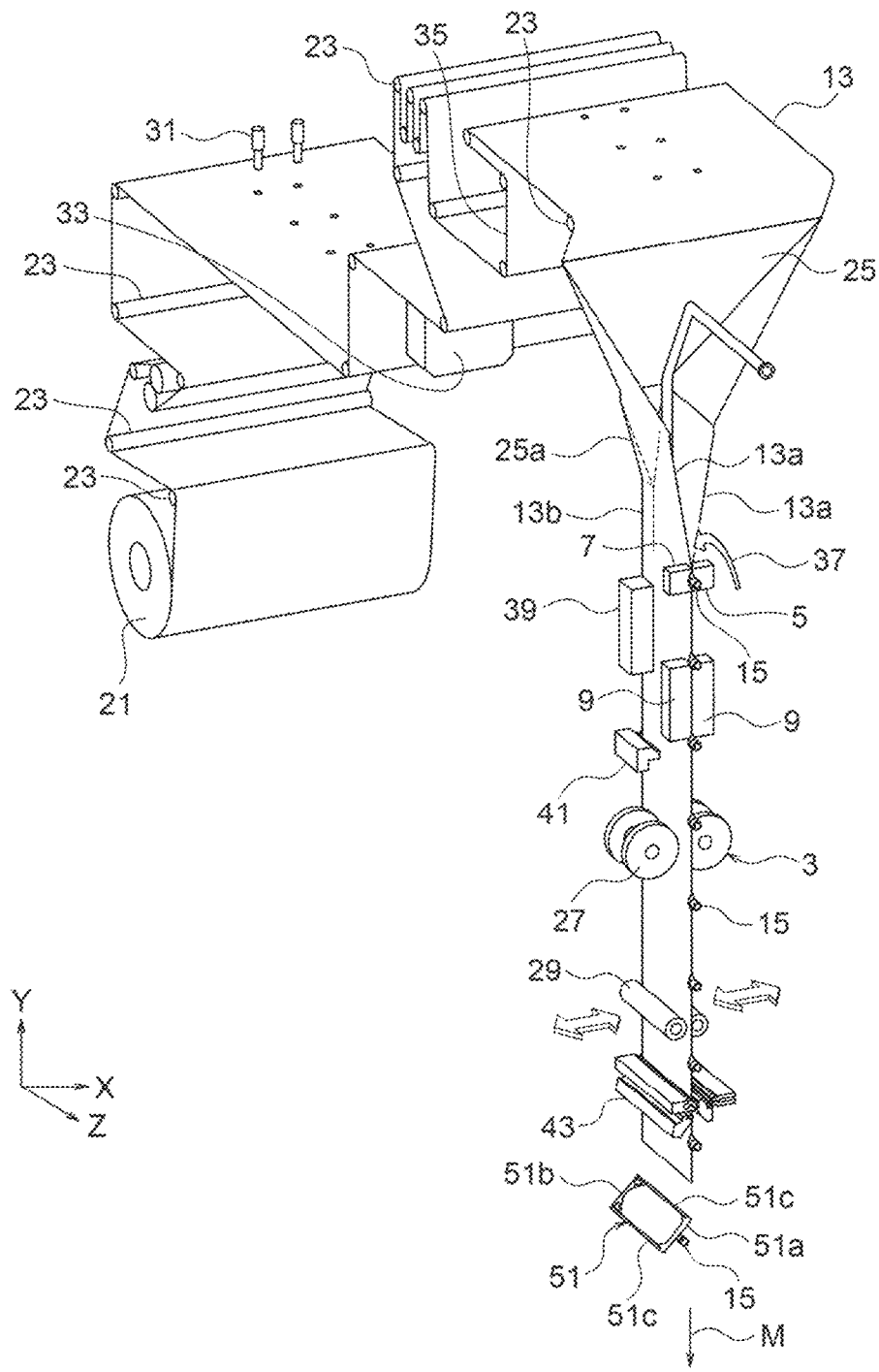
FIG. 3 is a perspective view of a transporting mechanism, the horn part, the anvil part, and the pair of heaters.

FIG. 1 illustrates an overall structure of a bonding device according to an embodiment of the present invention. FIG. 2 illustrates a horn part, an anvil part, and a pair of heaters, which are seen from an arrow II of FIG. 1. FIG. 3 is a perspective view of a transporting mechanism, the horn part, the anvil part, and the pair of heaters. The explanation uses three axes of X, Y, Z which are mutually orthogonal to one another. The X direction refers to a left-right direction, the Y direction refers to a height direction, and the Z direction refers to a front-rear direction.

A connection device 1 as the packaging device includes a transporting mechanism 3, a horn part 5, an anvil part 7, and a pair of heaters 9. The transporting mechanism 3, for example, includes a film roll 21 around which a film is roll-like wound at the most upstream side, a plurality of guide rollers 23, a bag forming part 25, a film feeding roller 27, and a squeezing roller 29. In the drawing, instead of numbering all the guide rollers 23, only part of them will be denoted by the reference code 23 for the purpose of prioritizing clarification of the drawing.

The film roll 21 of the transporting mechanism 3 is disposed at a rear outer side of a casing 11 of the connection device 1. The plurality of guide rollers 23 are arranged at the downstream side from a transporting path of the film roll 21 (hereinafter simply referred to as "downstream"), and bottom hole forming parts 31 are disposed at further downstream. The bottom hole forming parts 31 are disposed at the rear outer side of the casing 11.

The plurality of guide rollers 23 are arranged, and a printing part 33 are disposed downstream from the bottom hole forming parts 31. A zigzagging path having many closely arranged guide rollers 23 is disposed downstream from the printing part 33. At further downstream side, a zigzagging correction part 35, and the bag forming part 25 are disposed.

The bag forming part 25 disposed in the casing 11 is provided with a bottom folding part 25a. The bottom folding part 25a includes a guide which changes a position of the incoming film 13 having the flat sheet-like shape across its width so that the film is folded at the center in the width direction. As the film 13 passes through the bottom folding part 25a, it is folded to form a valley-like shape at a widthwise center 13b, and deformed so that both widthwise edges 13a are overlaid.

A stopper feeder 37 is disposed downstream from the bag forming part 25. The stopper feeder 37 feeds a stopper (spout) 15 so as to be interposed between the two widthwise edges 13a designed to be overlaid in the final stage. The stopper feeder 37 includes a rocking arm for moving the stopper 15 on a circular arc path and locating the stopper 15 between the two widthwise edges 13a. The stopper 15 is fed to the position at the same height as those of the horn part 5 and the anvil part 7. Specifically, the stopper 15 is fed to the position at the height where it is interposed between the horn part 5 and the anvil part 7, which have mutually approached as described later.

At the downstream side of the stopper feeder 37, a bottom sealing part 39 and a bottom 2-stage sealing part 41 process a section of the film, which corresponds to a bottom 51b of a pouch 51 as a final product. Meanwhile, the horn part 5, the anvil part 7, and the heaters 9 process a section of the film, which corresponds to a top 51a to be described later. The film then reaches a lateral sealing part 43 via the film feeding roller 27 and the squeezing roller 29. The lateral sealing part 43 seals sections of the film, which correspond to both sides 51c of the pouch 51 as the final product to define a sealed space (interior volume) of the pouch 51 as the final product, and then the film is cut at the section along the respective sides 51c of the pouch 51 as the final product.

An explanation will be made with respect to the horn part 5, the anvil part 7 and the pair of heaters 9. The horn part 5 and the anvil part 7 are paired. The horn part 5 and the anvil part 7 are disposed downstream immediately from the bag forming part 25 at left and right sides of a transporting path 17 on which the film 13 and the stopper 15 are transported. The horn part 5 and the anvil part 7 are facing with each other in the left-right direction, and arranged to be movable along the left-right direction. In other words, the horn part 5 and the anvil part 7 are disposed to have opposing ends movable in the direction approaching or separating from the transporting path 17.

The horn part 5 is allowed to apply ultrasonic waves to one side of the film 13 on the transporting path 17 in the left-right direction, and the anvil part 7 is allowed to apply heat to the other side of the film 13 on the transporting path 17 in the left-right direction.

The pair of heaters 9 are disposed downstream immediately from the horn part 5 and the anvil part 7 in a pair at left and right sides of the transporting path 17 on which the film 13 and the stopper 15 are transported. The pair of heaters 9 are facing with each other in the left-right direction. The pair of heaters 9 are movable along the left-right direction, respectively. In other words, the pair of heaters 9 are disposed to have opposing ends movable in the direction approaching or separating from the transporting path 17.

The pair of heaters 9 are allowed to apply heat to both sides of the film 13 on the transporting path 17 in the left-right direction, respectively.

Figure 4:
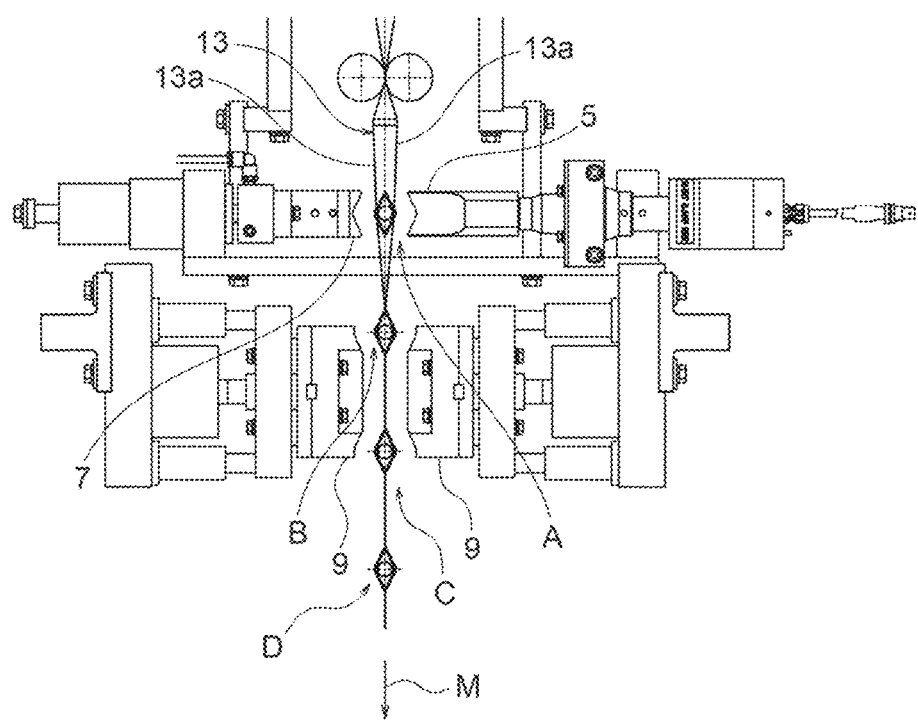
FIG. 4 illustrates a first phase of a bonding method according to the embodiment of the present invention.
Figure 5:
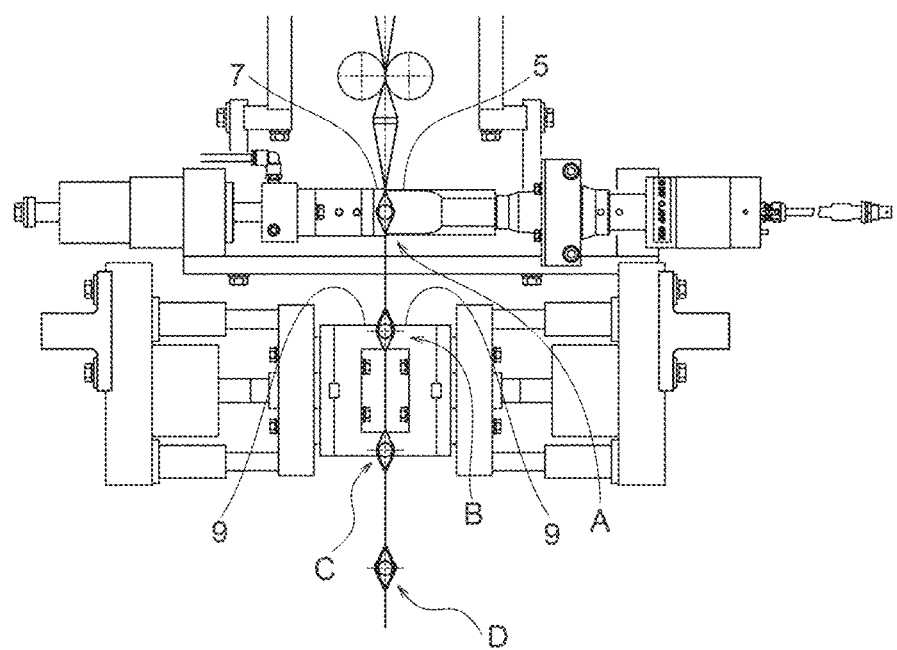
FIG. 5 illustrates a second phase of the bonding method according to the embodiment of the present invention.
Figure 6:
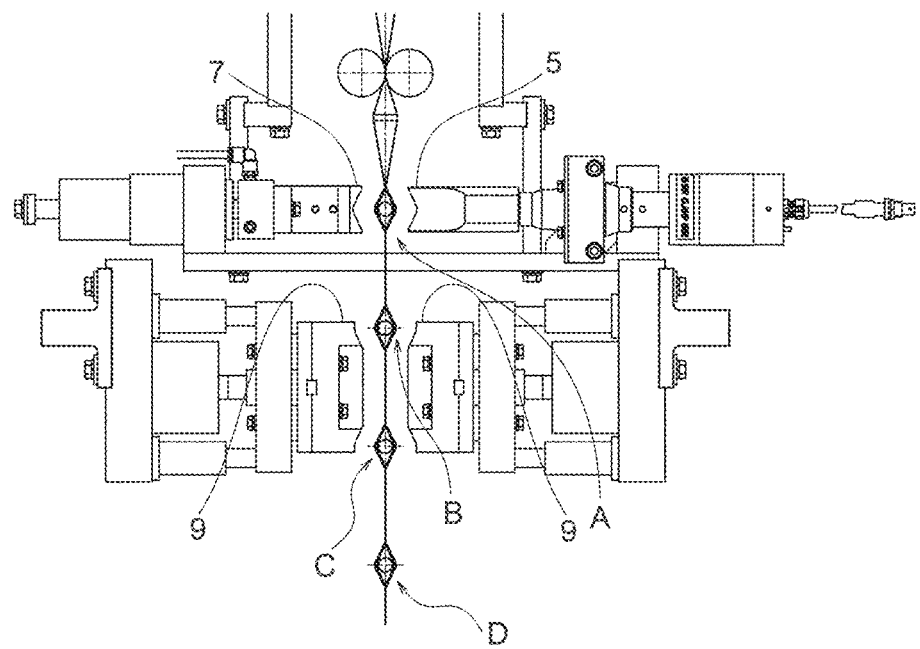
FIG. 6 illustrates a third phase of the bonding method according to the embodiment of the present invention.
Figure 7:
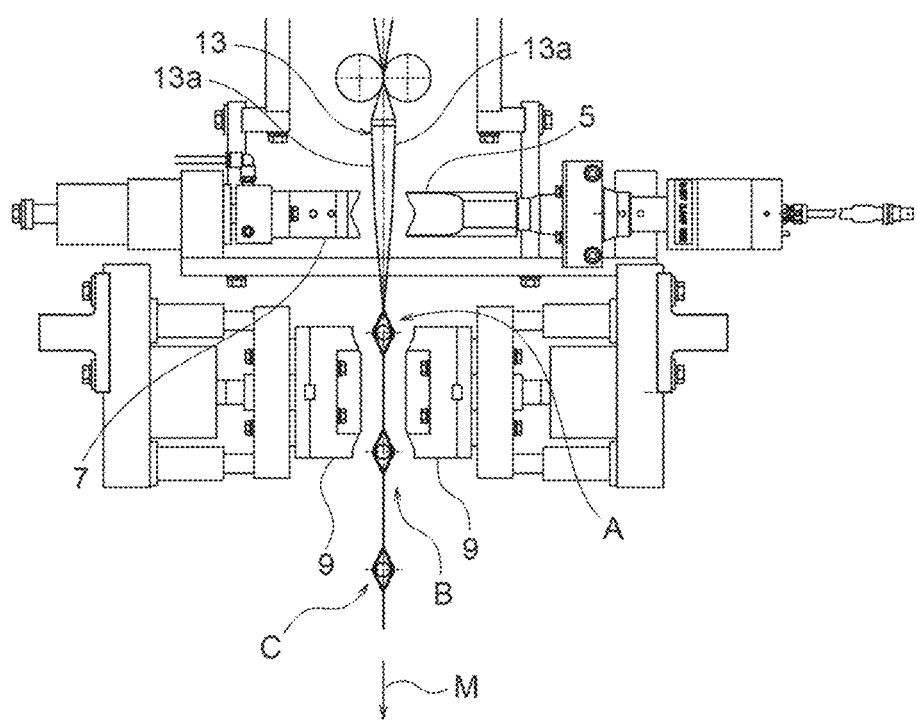
FIG. 7 illustrates a fourth phase of the bonding method according to the embodiment of the present invention.
Figure 8:
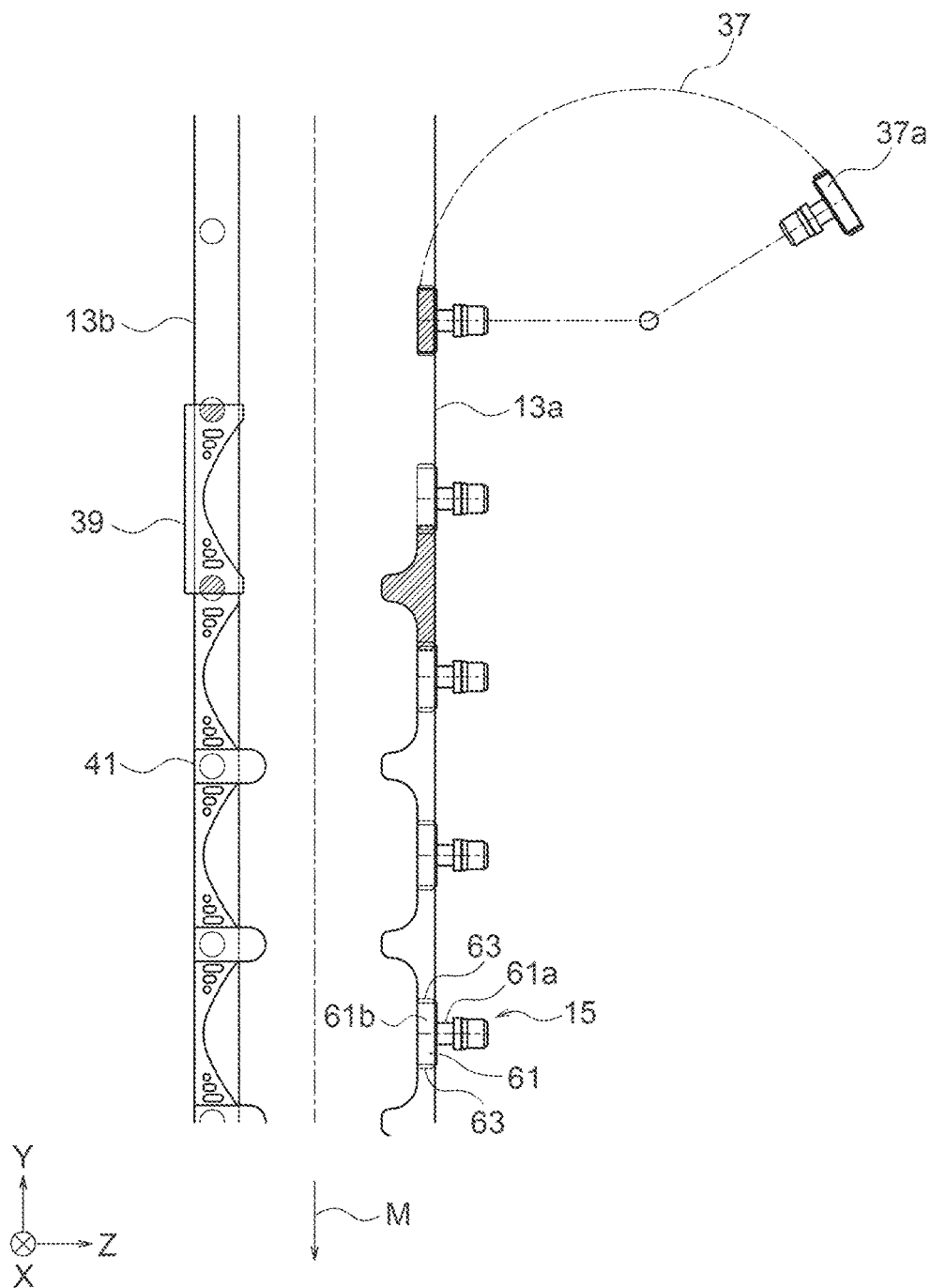
FIG. 8 schematically illustrates a bonding area in a transporting step.
Figure 9:
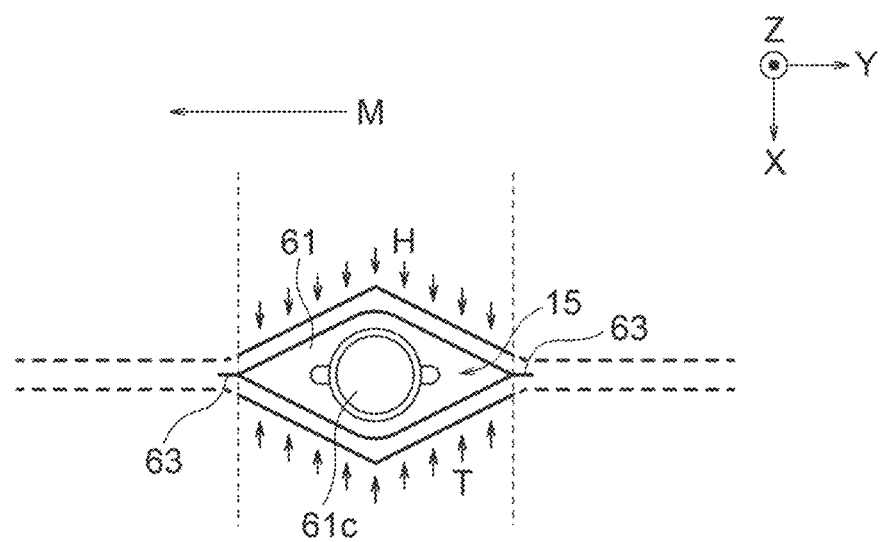
FIG. 9 illustrates a cylindrical body bonding step.
Figure 10:
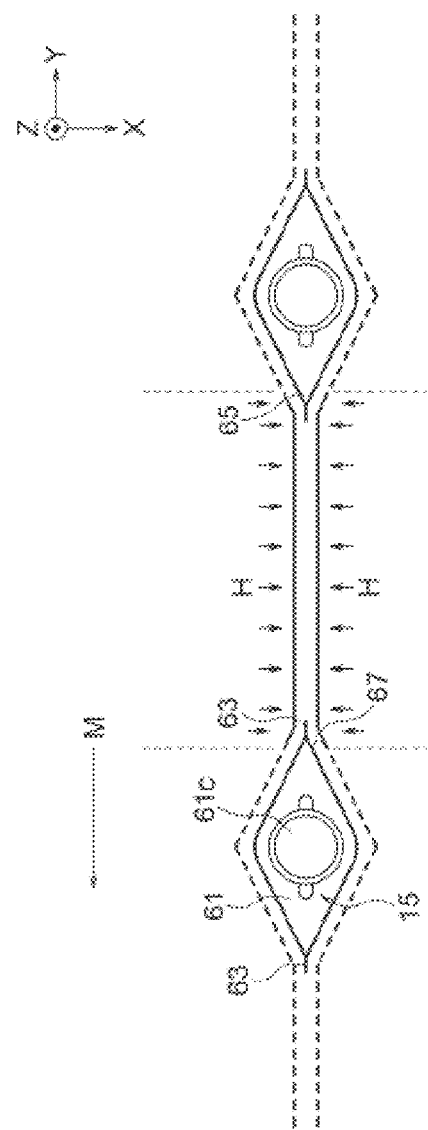
FIG. 10 illustrates a shoulder part bonding step.

Referring to FIGS. 4 to 10, an explanation will be made with respect to operations of the connection device 1, that is, the connection method (packaging method) according to the embodiment. FIG. 4 illustrates a first phase of a bonding method according to the embodiment of the present invention. FIG. 5 illustrates a second phase of the bonding method according to the embodiment of the present invention. FIG. 6 illustrates a third phase of the bonding method according to the embodiment of the present invention. FIG. 7 illustrates a fourth phase of the bonding method according to the embodiment of the present invention. FIG. 8 schematically illustrates a bonding area in a transporting step. FIG. 9 illustrates a cylindrical body bonding step. FIG. 10 illustrates a shoulder part bonding step.

The bonding method for bonding two sheet-shaped members and the cylindrical body interposed therebetween for forming the pouch 51 as the final product includes at least an arrangement step, a cylindrical body bonding step, and a shoulder part bonding step.

As FIG. 4 illustrates, in the arrangement step, the cylindrical body is placed between the two sheet-shaped members. Specifically, the stopper 15 as the cylindrical body is interposed between two sections of the film 13 which has been folded and overlaid by the bag forming part 25. The stopper 15 may be preliminarily heated by a stopper warmer 37a (see FIG. 8).

The cylindrical body bonding step is executed in the state where the cylindrical body is interposed between the two sheet-shaped members. In the step, as FIG. 5 illustrates, the horn part 5 and the anvil part 7, which have been separated from each other are moved in the mutually approaching direction so that the two sections of the film 13 and the stopper 15 are held between the horn part 5 and the anvil part 7. In the above-described holding state, the horn part 5 applies ultrasonic waves to the outer surface of a first sheet-shaped member, and the anvil part 7 applies heat to the outer surface of a second sheet-shaped member so that the cylindrical body and the two sheet-shaped members are bonded.

Each of the outer surfaces of the sheet-shaped members refers to the surface which constitutes an outside of the pouch 51 as the final product. Each of inner surfaces of the sheet-shaped members refers to the surface which constitutes an inner storage side or an inside of the pouch 51 as the final product. The horn part 5 is disposed at the outer surface side of the first sheet-shaped member. The anvil part 7 is disposed at the outer surface side of the second sheet-shaped member. The horn part 5 and the anvil part 7 hold the two sheet-shaped members and the cylindrical body so that ultrasonic wave is applied to one surface of the pouch 51 as the final product, and heat is applied to the other surface.

As FIG. 6 illustrates, the horn part 5 and the anvil part 7 are moved in the mutually separating direction. That is, the horn part 5 and the anvil part 7 are separated from the corresponding sheet-shaped members. Then the transporting mechanism 3 moves the two sheet-shaped members and the cylindrical body interposed therebetween in a predetermined transporting direction. In other words, a processing object denoted by a reference code A, which has been held between the horn part 5 and the anvil part 7 is shifted by a predetermined single pitch as illustrated in FIG. 7, and disposed at the upper section of the pair of heaters 9.

After transportation by the single pitch (FIG. 7), the processing object denoted by the reference code A is located at the position denoted by a reference code B indicating the position before transportation by the single pitch (FIGS. 4 to 6). At this position, in the shoulder part bonding step, the two sheet-shaped members interposing the cylindrical body are held by the pair of heaters 9 so as to be directly bonded. That is, while the processing object denoted by the reference code A is transported by the single pitch, the pair of heaters 9 which have been mutually separated move in the mutually approaching direction subsequently to the single-pitch transportation to hold the two sheet-shaped members. Then one of the heaters 9 applies heat to the outer surface of the first sheet-shaped member, and the other heater 9 applies heat to the outer surface of the second sheet-shaped member so that the two sheet-shaped members are bonded.

In other words, one of the heaters 9 is disposed at the outer surface side of the first sheet-shaped member, and the other heater 9 is disposed at the outer surface side of the second sheet-shaped member. The pair of heaters 9 hold the two sheet-shaped members for applying heat to the sections which correspond to the respective surface sides of the pouch 51 as the final product.

Referring to FIGS. 8 to 10, bonding areas in the cylindrical body bonding step and the shoulder part bonding step will be described in detail. In the embodiment, the stopper 15 includes a main body 61 and a pair of belt portions (burr) 63. The main body 61 includes a portion corresponding to an end-side cylindrical portion 61a of the pouch 51 as the final product, and a portion corresponding to a base portion 61b at a storage space side of the pouch 51 as the final product. The stopper 15 has a through hole 61c extending along an axial center of the cylindrical portion 61a while penetrating through the cylindrical portion 61a and the base portion 61b.

The base portion 61b is a section to be bonded to the film 13. In the embodiment, for example, the base portion 61b has a rhombus-shaped outer surface as illustrated by FIGS. 9 and 10 when seen from the extending direction of the through hole 61c. The cylindrical portion 61a has a cylindrical shape as illustrated by FIGS. 9 and 10. A not shown male screw is formed on an outer surface of the cylindrical shape, and fitted with a not shown screw cap when it is used as the pouch 51. Meanwhile, the pair of belt portions 63 extend from the corresponding ends of the base portion 61b in the direction separating from the through hole 61c. More specifically, the pair of belt portions 63 are located at both ends of the base portion 61b in the direction in which the film 13 is extending.

As FIG. 9 illustrates, in the cylindrical body bonding step, the horn part 5 and the anvil part 7 hold the film sections of the two sheet-shaped members of the film 13, which overlap with the main body 61 of the stopper 15 in the layering direction (overlaying direction or X direction), and the main body 61. In other words, the horn part 5 and the anvil part 7 apply the ultrasonic wave T and heat H to the area (shaded area of FIG. 8) corresponding to the film sections of the two sheet-shaped members of the film 13, which overlap with the main body 61 of the stopper 15 in the layering direction, and the main body 61. A range where the belt portions 63 are held is excluded from this area.

As FIG. 10 illustrates, in the shoulder part bonding step, the two sheet-shaped members of the film 13 are directly bonded. Additionally, in the step, film sections of the two sheet-shaped members of the film 13, which overlap with end portions of the main body 61 and the belt portions 63 of the stopper 15 in the layering direction (overlaying direction or X direction) held between the pair of heaters 9 to bond the film sections of the two sheet-shaped members of the film 13, which overlap with the belt portions 63 of the stopper 15 in the layering direction to the belt portions 63.

Actually, the plurality of stoppers 15 are supplied to the continuous film 13 at equal pitches and equal time intervals. Operations of the horn part 5 and the anvil part 7, the two heaters 9, and transporting operations will be described below. A series of operations will be repeatedly performed in the following order by executing processes for supplying the stopper as illustrated in FIG. 4, simultaneously closing the first pair of horn part 5 and anvil part 7, and the second pair of heaters 9 as illustrated in FIG. 5, simultaneously opening the first pair of horn part 5 and anvil part 7, and the second pair of heaters 9 as illustrated in FIG. 6, and transportation by the single pitch as illustrated in FIG. 7.

The device is configured to execute the cylindrical body bonding step and the shoulder part bonding step simultaneously in a single operation. Around a region where the two stoppers 15 are adjacently arranged in the transporting direction M as illustrated in FIGS. 8 and 10, the pair of heaters 9 simultaneously apply heat to the areas corresponding to sections of the two sheet-shaped members, which overlap with a downstream-side end portion 65 of the main body 61, and the downstream-side belt portion 63 of the transporting-direction-upstream-side stopper 15 in the layering direction, sections of the two sheet-shaped members, which overlap with an upstream-side end portion 67 of the main body 61, and the upstream-side belt portion 63 of the transporting-direction-downstream-side stopper 15 in the layering direction, and the section where the two sheet-shaped members directly overlap.

Meanwhile, upon formation of one pouch 51 as the final product from the processing object, the shoulder part bonding step is performed subsequent to the cylindrical body bonding step. More specifically, for example, referring to the reference codes of FIG. 5, the cylindrical body bonding step is performed at the position denoted by the reference code A. The processed object is transported by the single pitch to perform the shoulder part bonding step for processing the section corresponding to the downstream-side shoulder part of the pouch at the position denoted by the reference code B. The processed object is further transported by the single pitch so that the shoulder part bonding step is performed for processing the section corresponding to the upstream-side shoulder part of the pouch at the position denoted by a reference code C.

In the embodiment as described above, the ultrasonic wave application unit is provided for one of outer surface sides of the pouch, and the heat application unit is provided for the other outer surface side. It is not necessary to provide relatively costly and large-sized ultrasonic wave application units at both outer surface sides of the processing object to be formed as pouch. This makes it possible to avoid increase in the overall size of the device, and to perform bonding with less costly structure.

The embodiment provides significantly excellent advantages to be described below in addition to the cost reduction and avoidance of increase in size. The object to be bonded according to the present invention requires rather irregular approach for bonding the two sheet-shaped members and the cylindrical body interposed therebetween. That is, the two objects can be normally welded with no difficulties, or two sheet-shaped members can be welded with no difficulties so that those members can be sealed with ease. Difficulties will occur in welding of the two sheet-shaped members interposing the cylindrical body because of such irregularity as the hollow cylindrical body. The hollow portion is the cause of lowering the heat conductivity.

The following method is implemented as a comparative example for welding with intervention of the hollow portion while avoiding increase in the size and cost. The method is implemented for welding by executing three steps. In the first step, heat is applied intensively to the region of the sheet-shaped member, which overlaps with the cylindrical body. In order to bond the film and the stopper, which are the same as those of the embodiment, it is necessary to apply heat at the temperature as high as 150° C. for at least 1.4 seconds. Subsequently, in the second step, heat is applied to the region where the sheet-shaped members directly overlap in addition to the region which has been already heated in the first step across the entire width of the pouch as the final product. In the third step, the processed object is entirely cooled because the resin stopper as the cylindrical body retains heat. Performing those steps achieves the successful welding as a whole. In other words, the welding requires heating at the temperature as high as 150° C. for at least 1.4 seconds, which further necessitates the cooling step in the end.

In the embodiment, in the cylindrical body bonding step, the sheet-shaped members and the cylindrical body are welded while being pressed at the horn side. Meanwhile, ultrasonic vibrations propagate to the anvil side from the horn via the sheet-shaped members and the cylindrical body. That is, the ultrasonic vibration will be gradually attenuated as it propagates through the stopper. However, heat by quantity equivalent to the attenuation amount is applied from the anvil side to complement the energy required for welding. Welding may be performed at the anvil side without application of the ultrasonic waves. In this embodiment, heat is applied from the anvil side at the temperature ranging from 80 to 100° C. for a period as short as 0.3 seconds. The welding may be performed by heating at the lower temperature for significantly short period. The heating temperature may be selected from the wider range from 80 to 100° C., which allows the embodiment to be configured flexibly. The comparative example requires execution of the heating step twice to the cylindrical body which is likely to retain heat. In the embodiment, in the shoulder part bonding step subsequent to the cylindrical body bonding step, the cylindrical body is hardly heated. Moreover, with respect to the very heating of the cylindrical body, unlike the comparative example in which heat is applied to the cylindrical body at 150° C. for at least 1.4 seconds, in the embodiment, heat is applied at the temperature ranging from 80 to 100° C. for 0.3 seconds. In the embodiment as described above, the cooling step can be omitted so that the process is simplified. Omission of the cooling step will contribute to avoidance of increase in the size of the device and cost reduction of the device as a result of simplifying the process.

The embodiment provides the effect for simplifying the process and reducing the processing time period while reducing the cost and avoiding the size increase.

The embodiment provides the excellent advantage of stable bonding property. A certain type of the stopper has a pair of belt portions. As those belt portions are formed as molded products, unevenness inevitably occurs in those portions owing to the "sink mark" and the "warpage". As disclosed in Patent Literature 1, in the case of using the pair of ultrasonic wave application units for welding to the outer sides of the bonding object, there may cause the risk of failing to succeed in welding the bonding object having the belt portions with unevenness. The embodiment is intended to weld only the main body by applying the ultrasonic wave, and to bond the belt portions by heating. This makes it possible to achieve the stable bonding property even if bonding is performed in the condition where unevenness in the object with the stopper as the molded product unavoidably occurs.

As the explanation has been made with respect to the present invention in detail, it is to be understood by the person skilled in the art that various modifications can be made to the embodiment based on the basic technical ideas and teachings.

Assuming that the bag-shaped article with interior volume has its inside and outside separated by a partition member, and an inlet/outlet at least at one location for communication between the inside and the outside, the present invention may be implemented as the method and the device for connecting the partition member and the inlet/outlet. The bag-shaped article may be regarded as the object to which the present invention is applied independently of whether or not it is referred to as the pouch.

The usage of the bag-shaped article is not specifically limited. The article may be widely used for containing foods, beverages (including those in the fluidized state), medical supplies, daily necessities and industrial supplies for private activities and profit-making activities (for example, toothpaste tube, adhesive bond, coating material), playing tools, liquid, fluidized material, gas, powder material and the like for any other usage purposes.

Application of the present invention is not limited to the case in which the two sheet-shaped members are processed to form the bag-shaped member in the end. The present invention is widely applicable to bonding of the two sheet-shaped members and the cylindrical body interposed therebetween.

The two sheet-shaped members are not intended to be limited to the two individual parts which are completely separated before bonding, but applicable to the two parts formed by folding the single member as described in the embodiment.

The transporting mechanism according to the present invention is not specifically limited to the structure of the transporting mechanism as described in the embodiment. Arbitrary type of the transporting mechanism may be employed in a non-restrictive manner so long as the two sheet-shaped members are movable in the predetermined transporting direction along the predetermined transporting path.

The cylindrical body includes a cylindrical wall with various shapes when seen from the direction in which the hollow portion (through hole) extends. In the embodiment, although the base (base portion) has been exemplified as the one with rhombus shape, it is not limited to such configuration. The belt portion is not necessarily essential for the stopper. The stopper may be configured to have no belt portion.

The present invention may be implemented by modifying the process for performing the cylindrical body bonding step subsequently to the shoulder part bonding step. In this case, upstream/downstream positions in the transporting direction may be switched between the first pair of horn part 5 and anvil part 7 and the second pair of two heaters 9.

REFERENCE SIGNS LIST

1 Connection device
3 Transporting mechanism
5 Horn part
7 Anvil part
9 Heater
13 Film (sheet-shaped member)
15 Stopper (cylindrical body)
61 Main body
63 Belt portion

The invention claimed is:

1. A bonding method for bonding two continuous sheet-shaped members and a cylindrical body interposed between the two continuous sheet-shaped members, comprising:
an arrangement step for locating the cylindrical body between the two continuous sheet-shaped members;
a cylindrical body bonding step for bonding the cylindrical body to the two continuous sheet-shaped members by applying an ultrasonic wave to an outer surface of a first one of the continuous sheet-shaped members using a horn part, and applying heat to an outer surface of a second one of the continuous sheet-shaped members using an anvil part, in a state where the cylindrical body is interposed between the two continuous sheet-shaped members; and
a shoulder part bonding step for directly bonding the two continuous sheet-shaped members together at a location between adjacent cylindrical bodies by a pair of heaters on opposite sides of the two continuous sheet-shaped members between the pair of heaters, in a state where the cylindrical body is interposed between the two continuous sheet-shaped members.

2. The bonding method according to claim 1, wherein the shoulder part bonding step is executed subsequent to execution of the cylindrical body bonding step.

3. The bonding method according to claim 1, wherein execution of the cylindrical body bonding step is completed by applying the ultrasonic wave and heat to the two continuous sheet-shaped members and the cylindrical body for one second or shorter.

4. The bonding method according to claim 1, wherein:
the cylindrical body includes a main body and a belt portion; and
the cylindrical body bonding step is executed by holding the main body and sections of the two continuous sheet-shaped members between the horn part and the anvil part, said sections overlap with the main body of the cylindrical body in a layering direction.

5. The bonding method according to claim 4, wherein the shoulder part bonding step includes bonding the belt portions to sections of the two continuous sheet-shaped members, which overlap with the belt portions of the cylindrical body in the layering direction, with an operation of holding sections of the two continuous sheet-shaped members, which overlap with end portions of the main body and the belt portions of the cylindrical body in the layering direction, by the pair of heaters.

\* \* \* \* \*